United States Patent
Marchetti

(10) Patent No.: US 9,829,068 B2
(45) Date of Patent: Nov. 28, 2017

(54) SEAMLESS END CONNECTION FOR CONVEYOR BELTS

(71) Applicant: Uniband USA, LLC, Grand Rapids, MI (US)

(72) Inventor: Franco Milco Marchetti, Ada, MI (US)

(73) Assignee: UniBand USA, LLC, Grand Rapids, MI (US)

( * ) Notice: Subject to any disclaimer, the term of this patent is extended or adjusted under 35 U.S.C. 154(b) by 0 days.

(21) Appl. No.: 15/405,784

(22) Filed: Jan. 13, 2017

(65) Prior Publication Data

US 2017/0204937 A1    Jul. 20, 2017

Related U.S. Application Data

(60) Provisional application No. 62/278,511, filed on Jan. 14, 2016.

(51) Int. Cl.
*B65G 15/34* (2006.01)
*F16G 3/10* (2006.01)
(Continued)

(52) U.S. Cl.
CPC .............. *F16G 3/10* (2013.01); *B29C 65/54* (2013.01); *B29C 66/431* (2013.01); *B29C 66/71* (2013.01);
(Continued)

(58) Field of Classification Search
CPC ........... F16G 3/10; B65G 15/34; B29D 29/06; B29C 65/54; B29C 66/431; B29C 66/71; B29C 66/721; B29C 66/729; B29K 2105/256; B29K 2067/00; B29K 2105/0809; B29L 2009/00; B29L 2031/7092
(Continued)

(56) References Cited

U.S. PATENT DOCUMENTS 3,300,826 A * 1/1967 Read ................... B29C 66/1142
156/157
4,034,617 A * 7/1977 Guyer ................... B29C 66/723
198/844.2
(Continued)

OTHER PUBLICATIONS

Flexco, "Technical Solutions for Belt conveyor Productivity", Insights, 2014 Flexible Steel Lacing Company.
(Continued)

*Primary Examiner* — Mark A Deuble
(74) *Attorney, Agent, or Firm* — Gardner, Linn, Burkhart & Flory, LLP

(57) ABSTRACT

An endless conveyor belt loop includes a conveyor belt that has an elongated body and a substantially uniform width. The ends of the conveyor belt each include a splice formation extending across the width of the conveyor belt that are each configured to mate with the other. A thermoplastic connector is thermally engaged between exposed surfaces formed by the splice formation at the ends of the conveyor belt. When the splice formations are aligned, the thermoplastic connector is thermally engaged and continuously interconnected between the ends for conveyor belt to form a seamless end connection. The thermoplastic connector comprises a thermoplastic copolyester elastomer.

24 Claims, 11 Drawing Sheets

(51) Int. Cl.
   *B29D 29/06*   (2006.01)
   *B29C 65/54*   (2006.01)
   *B29C 65/00*   (2006.01)
   B29K 105/00    (2006.01)
   B29K 67/00     (2006.01)
   B29K 105/08    (2006.01)
   B29L 9/00      (2006.01)
   B29L 31/00     (2006.01)

(52) U.S. Cl.
   CPC .......... *B29C 66/721* (2013.01); *B29C 66/729* (2013.01); *B29D 29/06* (2013.01); *B65G 15/34* (2013.01); *B29K 2067/00* (2013.01); *B29K 2105/0809* (2013.01); *B29K 2105/256* (2013.01); *B29L 2009/00* (2013.01); *B29L 2031/7092* (2013.01)

(58) Field of Classification Search
   USPC .................................................... 198/844.2
   See application file for complete search history.

(56) References Cited

U.S. PATENT DOCUMENTS

| | | | | |
|---|---|---|---|---|
| 4,109,543 A * | 8/1978 | Foti | ......................... | B32B 27/12 156/137 |
| 4,427,107 A * | 1/1984 | Roberts | ..................... | F16G 3/10 156/304.5 |
| 4,767,389 A * | 8/1988 | Habegger | ............... | B29C 65/18 474/263 |
| 5,316,132 A | 5/1994 | Muraoka et al. | | |
| 5,951,441 A * | 9/1999 | Dalebout | ............... | A63B 22/02 198/844.2 |
| 6,488,798 B1 * | 12/2002 | Thornton | ................ | B29C 65/56 156/154 |
| 7,650,987 B2 * | 1/2010 | Taniguchi | ............... | B29C 65/02 198/844.2 |
| 2003/0201057 A1 * | 10/2003 | Dolan | ....................... | F16G 3/10 156/98 |
| 2006/0163042 A1 * | 7/2006 | Vogt | ....................... | B65G 15/34 198/844.1 |
| 2012/0168285 A1 * | 7/2012 | Holland | ................ | B65G 15/34 198/847 |
| 2014/0021021 A1 * | 1/2014 | Pero | ....................... | B65G 15/34 198/847 |
| 2015/0144254 A1 * | 5/2015 | Albrecht | ............... | B65G 15/34 156/154 |

OTHER PUBLICATIONS

DuPont, "DuPont Product Information on DuPont Htyrel 4056P Thermoplastic Polyester Elastomer", Aug. 12, 2014.
Continental Contitech, "Installing and Splicing Textile Conveyor Belts", 2010 Conveyor Belt Group, pp. 1-28.
Flexco, "Novitool Pun M Mobile Finger Punch", 2014 Flexible Steel Lacing Company.
Flexco, "Get The Facts About Conveyor Belt Splicing Techniques", 2010 Flexible Steel Lacing Company.
Flexco, "Belt Splicing Solutions for Food Processing Operations", 2013.
Wikipedia, "Polyvinyl Chloride", Jul. 7, 2016, found at https://en.wikipedia.org/wiki/Polyvinyl_chloride.

* cited by examiner

SEAMLESS END CONNECTION FOR CONVEYOR BELTS

CROSS REFERENCE TO RELATED APPLICATION

The present application claims the benefit of U.S. provisional application Ser. No. 62/278,511, filed Jan. 14, 2016, which is hereby incorporated herein by reference in its entirety.

FIELD OF THE INVENTION

The present invention relates generally to conveyor belt end connections and methods of attachment, and more particularly to spliced end connections of conveyor belts.

BACKGROUND OF THE INVENTION

There are several known ways to splice or attach the ends of a conveyor belt together that can be used based on the types of material and thickness of the belting, in addition to the anticipated loads and tension that the belt will experience in use. However, there are fewer ways to splice or attach single fabric belts in a manner that meets load and tension requirements, while allowing the belt to be used in a sanitary environment or other application that preferably utilizes a belt with a seamless or continuous upper surface. Other conveyor belts, such as those with multiple fabric layers and thermosetting cover materials, can also experience similar difficulties in spicing and forming end connections without the use of mechanical fasteners.

One example of a known type of connector for single fabric belting is the use of a mechanical fastener, such as a metal wire-hook fastener that uses hooks or loops pierced into the belting along opposing ends of the conveyor belt and secured together by an elongated pin that extends through aligned openings in the metal hooks when the loop ends are meshed together. Although mechanical fasteners can provide a secure connection capable of undergoing high tensile loads, these connectors can be undesirable in sanitary processing environments, such as food preparation, and other similar environments, due to the potential for corrosion and accumulation of particles at the connector, among other commonly understood drawbacks.

Another example of a known connection method for single fabric belting is attachment by skived splicing, where the ends of the belting can each be cut and shaved into a single wedge that overlaps the corresponding wedge on the opposing end, where the shaved surface areas can be held together with a rubber cement adhesive. This form of connection can be difficult and time consuming to form properly, and typically requires the opposing wedges to be consistently formed across the width of the belt at an angle that is small enough to provide sufficient surface area for consistent bonding strength that meets the requisite tensional forces for using the belt. Commonly, these opposing skived wedges can be uneven and result in inconsistent belt thicknesses at the overlapping connection area, an unstable overall connection, and an increased potential for the belt to wonder on a conveyor system.

SUMMARY OF THE PRESENT INVENTION

The present invention provides an end connection for a conveyor belt that may be used to form an endless conveyor belt loop. According to one aspect of the invention, the conveyor belt generally includes a single fabric carcass and at least one layer of polymer disposed over an upper portion of the fabric carcass. A finger splice formation or configuration is cut or otherwise provided at the opposing ends of the conveyor belt, such that the opposing ends align or mesh with each other in a manner that provides a generally consistent spacing between the cut edges of such finger splice formation. The cut edges of the finger splice formation at the opposing ends may each be generally perpendicular to an upper surface of the conveyor belt and expose the woven filaments of the fabric carcass. A thermoplastic connector, comprising a thermoplastic copolyester elastomer, is thermally engaged between the opposing ends of the conveyor belt, so that the thermoplastic material is impregnated into the exposed woven filaments of the fabric carcass of each opposing end to form a seamless end connection, so as to significantly improve upon known finger splice joints that do not interpose the extra polymer connector.

According to another aspect of the present invention, an endless conveyor belt loop includes a single conveyor belt having an elongated body and a substantially uniform width. The ends of the conveyor belt each include a splice formation extending across the width of the conveyor belt that are each configured to mate with the other. A thermoplastic connector is thermally engaged between exposed surfaces formed by the splice formation at the ends of the conveyor belt. When the splice formations are aligned, the thermoplastic connector is thermally engaged and continuously interconnected between the ends for conveyor belt to form a seamless end connection. The thermoplastic connector comprises a thermoplastic copolyester elastomer. The conveyor belt may include a cover layer disposed over a fabric carcass that comprises a thermosetting polymer or a thermoplastic elastomer. Also, the splice formation may include a step formation, where the step formation has longitudinally separated cut edges at separated layers of the conveyor belt extending across the width of the conveyor belt, or a finger formation, where the finger formation has a cut edge forming a series of longitudinal protrusions spaced across the width of the conveyor belt.

According to another aspect of the present invention, an endless conveyor belt loop includes a single conveyor belt having an elongated body and a substantially uniform width. The ends of the conveyor belt each include a finger splice formation across the width of the conveyor belt that is defined by a cut edge that forms a series of longitudinal protrusions configured to mate with a corresponding series of longitudinal protrusions at the opposing end of the conveyor belt. A thermoplastic connector thermally engages between the ends of the conveyor belt. When the finger splice formations are aligned to provide a longitudinal opening between the cut edges, the thermoplastic connector is thermally engaged and continuously interconnected between the cut edges and has a thickness substantially equal to the conveyor belt to form a seamless end connection. The thermoplastic connector may comprise a thermoplastic copolyester elastomer, and such a conveyor belt may comprises a thermosetting polymer and/or thermoplastic polymer.

According to yet another aspect of the present invention, a method is provided for connecting opposing ends of a conveyor belt having a single fabric carcass that includes a first set of filaments extending in a lateral direction that are woven with a second set of filaments extending in a longitudinal direction between opposing ends of the conveyor belt. A cover or exterior polymer is disposed in a layer over the fabric carcass of the conveyor belt. The opposing ends of the conveyor belt may be cut or otherwise formed in a finger splicing configuration that provides longitudinal protrusions or fingers cut in a spaced arrangement along an edge of each opposing end with openings defined between the longitudinal protrusions. The longitudinal protrusions of each opposing end are meshed and aligned with the spacing or openings on each opposing end to define a longitudinal space between edges of the opposing ends. The defined longitudinal space between the opposing ends of the conveyor belt is filled with a joining material that may comprise a thermoplastic copolyester elastomer for bonding or joining the ends. The opposing ends of the conveyor belt are heated to cause the joining material to thermally soften and thereby adhere to and thermally engage with exposed filaments of the fabric carcass at the edges of each opposing end to form a seamless end connection.

These and other objects, advantages, purposes and features of the present invention will become apparent upon review of the following specification in conjunction with the drawings.

DETAILED DESCRIPTION OF THE EMBODIMENTS

Figure 1:
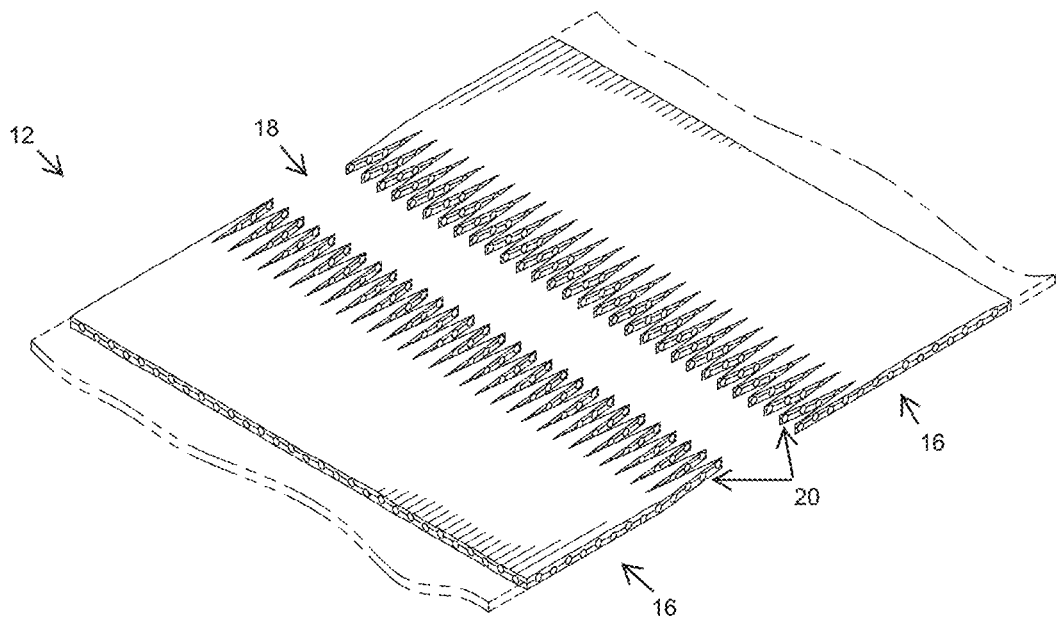
FIG. 1 is an upper perspective view of opposing ends a conveyor belt having a finger splice formation cut across the conveyor belt.

Referring now to the drawings and the illustrative embodiments depicted therein, an end connection 10 for a conveyor belt 12 can be formed in accordance with the present invention to form an endless loop or otherwise attach the conveyor belt to another section of belting. The end connection 10 for the conveyor belt 12 generally includes a thermoplastic connector 14 or joining material, such as a thermoplastic copolyester elastomer or like material that thermally engages between the opposing end portions 16 of the conveyor belt 12. The end portions 16 of the belting may include a splice formation or configuration, such as a finger splice formation 18, 118, 218 (FIGS. 1-12B) or a step formation 318 (FIGS. 13A-C) or the like. The finger splice formation 18 is cut or formed to provide cut edges 20 that may be generally perpendicular to an upper surface of the conveyor belt 12 and expose the fabric carcass 22 of the conveyor belt 12. Upon heating the end portions 16 to thermally engage the thermoplastic connector 14, the thermoplastic material adheres to the cut edges 20 and may impregnate the exposed woven filaments 24 of the fabric carcass 22 to form a generally seamless end connection that meets tension load requirements, while not using metal fasteners or the like.

Figure 12:
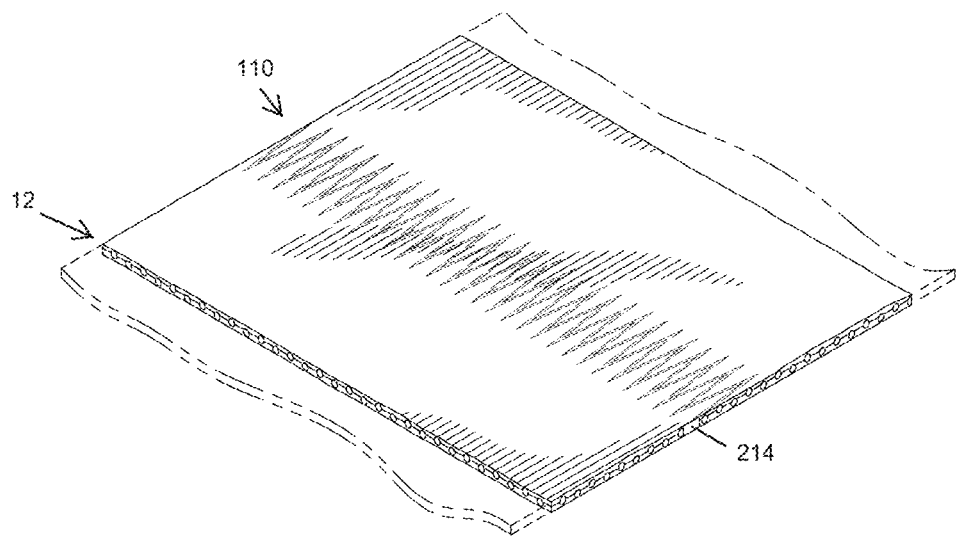
FIG. 12 is a top perspective view of the opposing ends of the conveyor belt shown in FIG. 11, having the thermoplastic material engaged between the ends of the conveyor belt to form a seamless end connection.
Figure 13A:
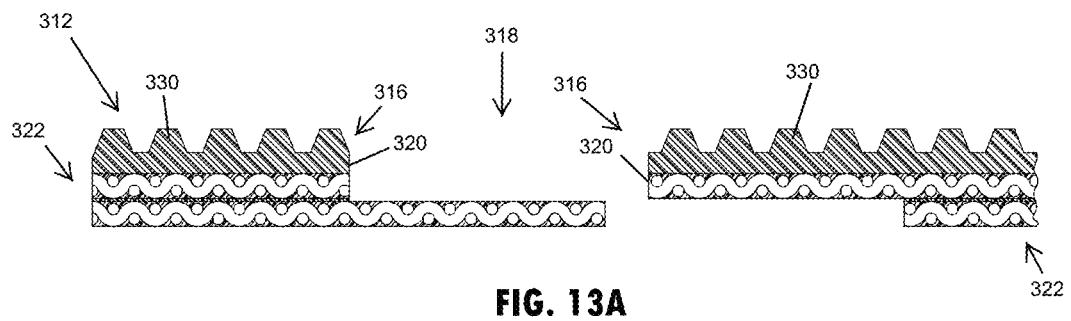
FIG. 13A is a cross-sectional view of a conveyor belt having a rubber cover disposed over two layers of fabric that are spliced in a stepped splice formation.
Figure 13B:
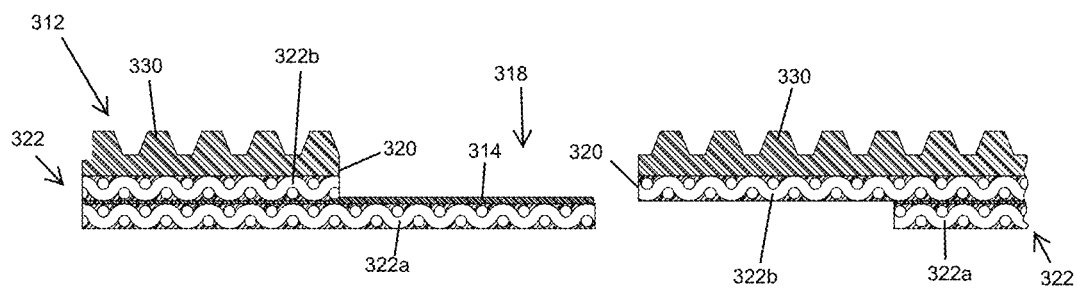
FIG. 13B a cross-sectional view of the conveyor belt shown in FIG. 13A, having a film sheet of thermoplastic material at the bottom layer of fabric in the stepped splice formation.
Figure 13C:
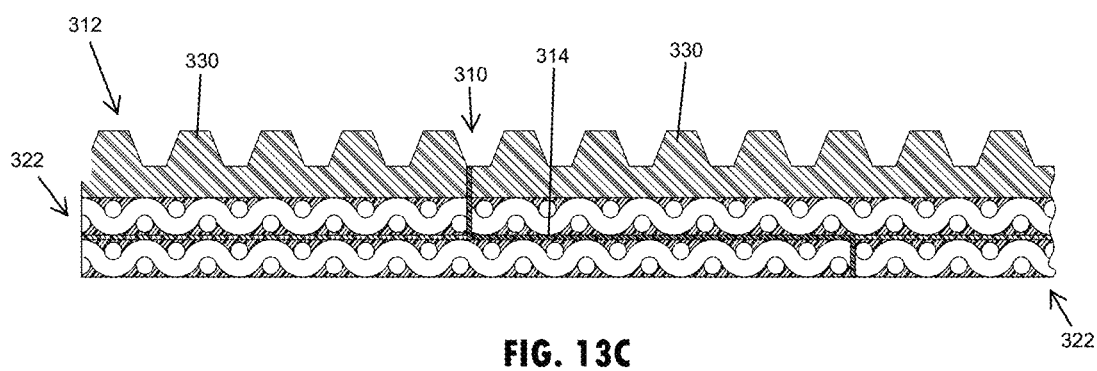
FIG. 13C a cross-sectional view of the conveyor belt shown in FIG. 13B, having the film sheet of thermoplastic material thermally engaged between the exposed surfaces of the opposing ends of the conveyor belt at the stepped splice formation.

The conveyor belt 12 shown in FIGS. 1-12B includes a single-ply construction that has a single layer or sheet of fabric. Such a single-ply construction is not capable of being spliced in staggered, overlapping layers, as may be done at end connections for fabric conveyor belting having multiple distinct layers of fabric that can be separated by a layer of material, such as a flexible polymer or the like. Accordingly, the fabric carcass 22 of the conveyor belt 12 comprises a single fabric, such as a single layer or sheet of fabric, which may be an interwoven or solid woven fabric or a fabric with a plain weave or other type of generally known fabric construction. It is, however, contemplated that the end connection of the present invention may be formed with a conveyor belt that has multiple fabric layers, such as shown in FIGS. 13A-13C.

Figure 4:
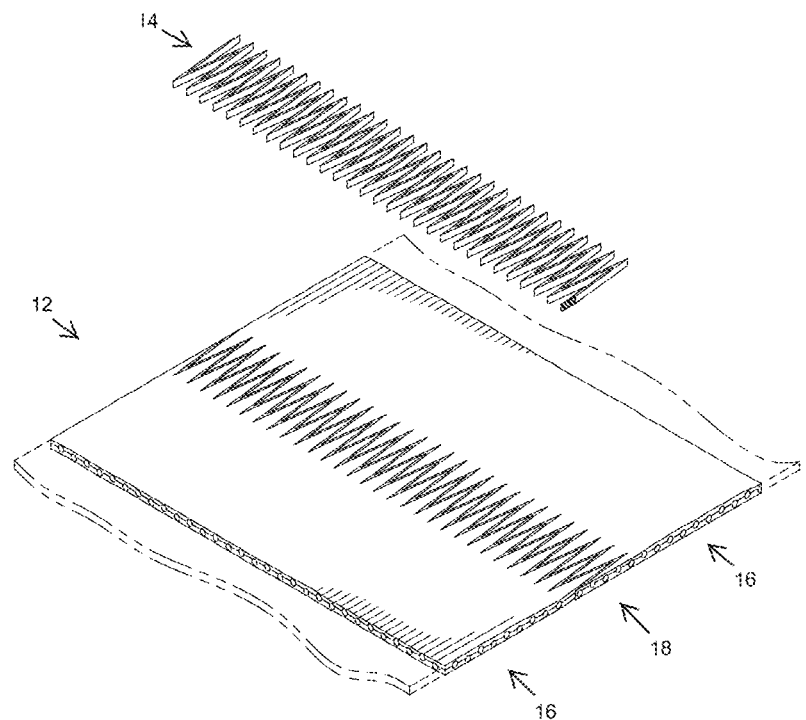
FIG. 4 is an upper perspective view of the opposing ends the conveyor belt shown in FIG. 1, illustrating a pre-formed thermoplastic connector exploded away from a space between the ends.
Figure 4A:
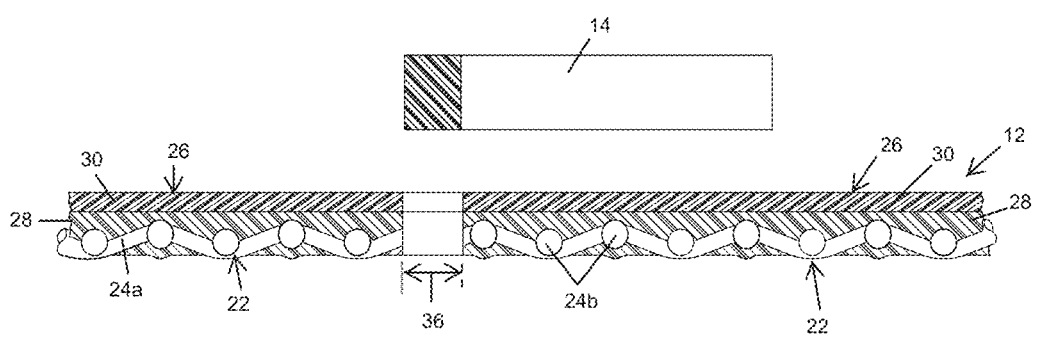
FIG. 4A is a cross-sectional view of the conveyor belt and the thermoplastic connector shown in FIG. 4.
Figure 5:
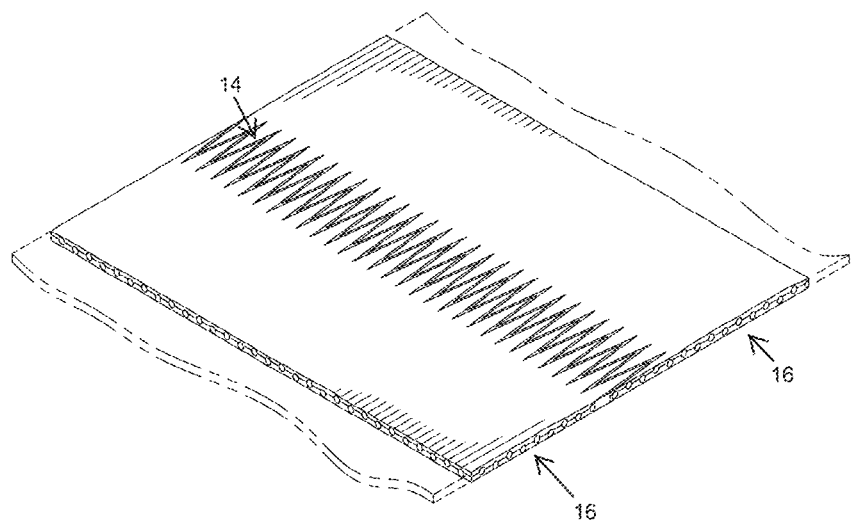
FIG. 5 is an upper perspective view of the opposing ends the conveyor belt shown in FIG. 1, having the pre-formed thermoplastic connector inserted into the space between the ends of the conveyor belt.
Figure 5A:
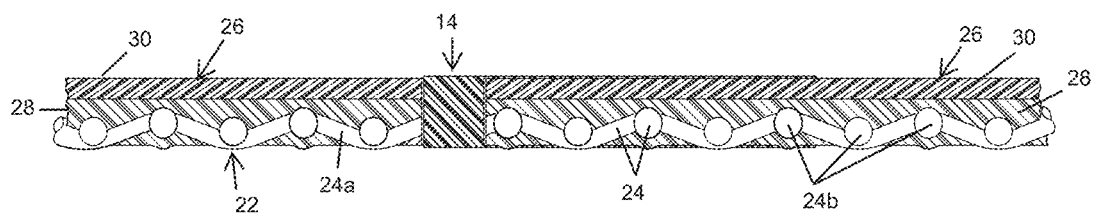
FIG. 5A is a cross-sectional view of the conveyor belt and the interposed thermoplastic connector shown in FIG. 5.

The weave of the fabric carcass 22 generally defines a first set of filaments 24a extending in one direction that are woven with a second set of filaments 24b extending in another direction generally perpendicular to the first set of filaments. As such, the conveyor belt 12 may convey loads in either direction of the first or second set of filaments (warp or weft directions) to have increased tensional load strength. For purposes of this description, the illustrated example of the conveyor belt 12 is configured to convey loads in a longitudinal direction, such that the first set of filaments 24a are generally parallel to the direction of conveyance and the second set of filaments 24b extend generally across the width of the conveyor belt 12 (FIGS. 4A and 5A). It is contemplated that the fabric carcass 22 may be formed with polyester, polyamide, rayon, cotton, nylon, or any combination thereof. Also, the fabric carcass 22 can be any conventional weave, but preferably a weave with relatively wide openings or pores help to allow resin to impregnate and attach to the fabric carcass. It is also contemplated that the belt carcass 22 may be a composite with strands of monofilaments, such as carbon fibers, metals, or any of the fabric materials listed above, extending in the longitudinal direction and interconnected with other conceivable materials The conveyor belt 12 may also include a layer of polymer 26 disposed over a portion of the fabric carcass, such as over an upper surface or portion of the fabric carcass 22, as illustrated in FIG. 4A. The layer of polymer 26 may be embedded into the pores of the fabric carcass and/or accumulated in a distinct layer on a top side of the fabric carcass 22. For example, as shown in FIG. 4A, the layer of polymer 26 may include a base layer 28 of thermoplastic resin that is at least partially impregnated in the openings or pores of the belt carcass 22 and accumulate on an exterior side of the belt carcass 22 to cure with a define thickness away from the belt carcass 22. The base layer 28 may act as a reinforcement for the fabric carcass 22 and may include various materials, such as a polyvinyl chloride (PVC) resin with a plasticizer additive to provide robustness to the belt at a relatively low cost compared to a polyester elastomer or the like. Optionally, the base layer may also define the upper exterior surface of the conveyor belt or a portion thereof, such as when a cover layer is not present.

The layer of polymer 26 may also include an outer layer of polymer or a cover 30 that is disposed over the carcass, such as onto the cured base layer 28, to form an exterior surface of the conveyor belt 12. The cover 30 may be a polyester elastomer resin that is configured for conveyor systems, such as for resiliently interfacing with a die press of a cutting or stamping station. Optionally, the cover layer 30 may include a thermoplastic copolyester elastomer, such as DuPont's Hytrel®, to provide improved resiliency and enhanced durability. The cover or cover layer 30 of elastomer may provide greater compressive resiliency than the reinforcing polymer layer 28. Optionally, the cover layer 30 may be disposed directly against and attached to the fabric carcass 22, omitting the base layer 28. It is also conceivable that the layer 26 or a portion thereof may be a thermosetting polymer, such as polyurethane, although some benefits of the heat application in forming the connector of the present invention would be reduced with the inclusion of such a thermosetting material.

At the opposing end portions 16 of the conveyor belt 12, the splice formation 18 is cut or otherwise formed entirely through the belt 12 between the exterior surfaces of the belt to define a shape that aligns or meshes with the other opposing end portion 16 in a manner that provides a spacing between the cut edges 20. The splice formation may include various shapes and patterns, such as a finger splice formation that includes longitudinal protrusions 32 or fingers spaced along an edge of the belt ends with spacing or openings defined between the longitudinal protrusions 32. These longitudinal protrusions 32 may then be aligned with the spacing or openings between the longitudinal protrusions on the opposing end to define a longitudinal space between the opposing ends, such as a generally consistent gap that is greater than about 0.5 mm. For example, as shown in FIGS. 1-3, the splice formation 18 is cut across the width of the conveyor belt 12 in a zig-zag pattern or shape that defines spaced wedge-shaped longitudinal protrusions 32 that matably align with the corresponding wedge-shaped openings 34 or spaces between the longitudinal protrusions.

Figure 2:
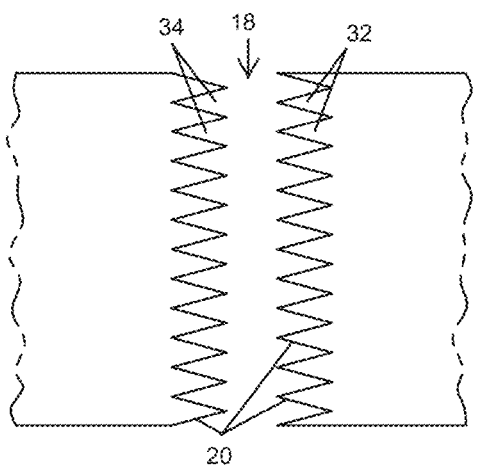
FIG. 2 is a top plan view of the opposing ends the conveyor belt shown in FIG. 1.
Figure 3:
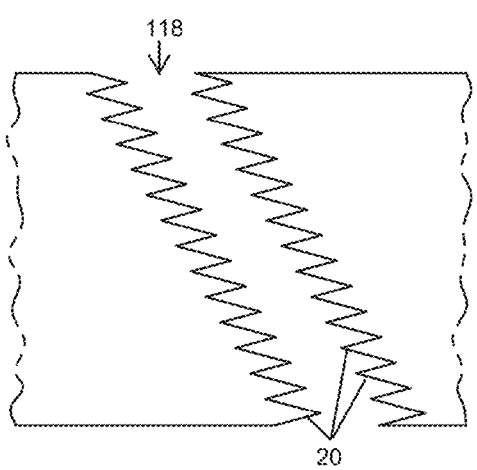
FIG. 3 is a top plan view of the opposing ends of a conveyor belt having a different finger splice formation cut across the conveyor belt.
Figure 9:
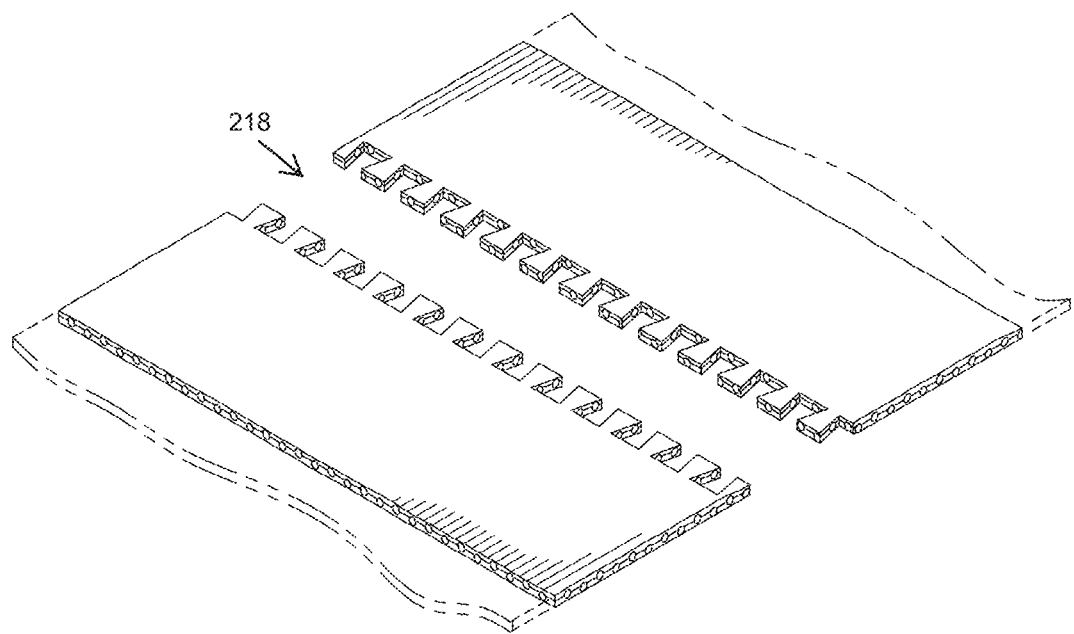
FIG. 9 is an upper top perspective view of the opposing ends of a conveyor belt having a different finger splice formation cut across the conveyor belt.
Figure 10:
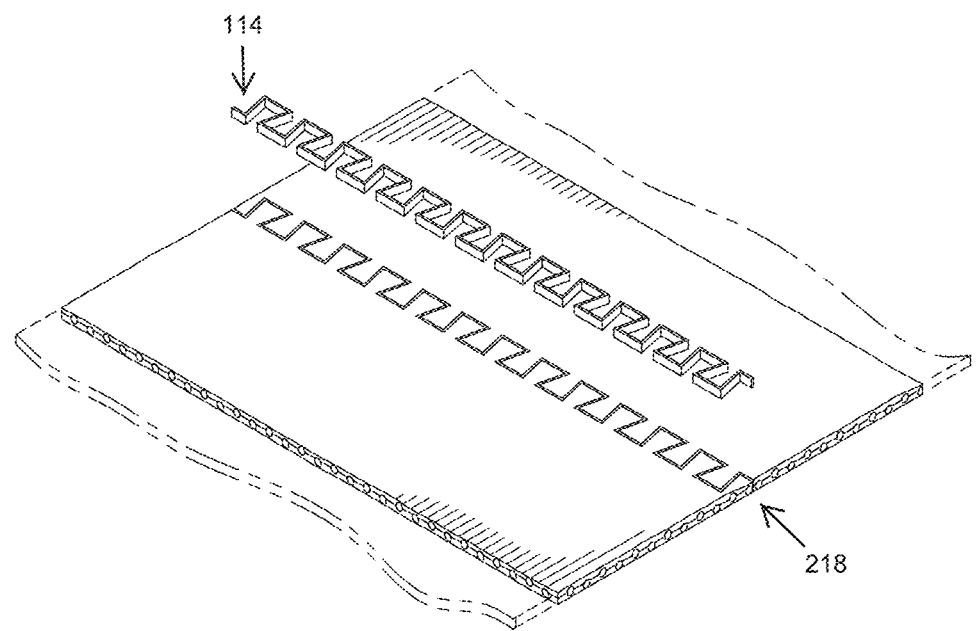
FIG. 10 is an upper perspective view of the opposing ends of the conveyor belt shown in FIG. 9, illustrating a pre-formed thermoplastic connector exploded away from a space between the ends.

The splice formation 18 may be cut generally perpendicular across the width of the belt 12, such as shown at FIGS. 1 and 2, or at an angle across the width, such as shown with formation 118 at FIG. 3. To form the finger splice formations 18 shown in FIGS. 1-3, a single cut may be made through the conveyor belt, such as with a zig-zag shaped die or blade, and then the cut edges 20 may be moved apart and aligned to define the desired spacing 36 between the cut ends of the belt. Another example of a finger splice formation 218 is shown in FIGS. 9 and 10 with a shape that forms longitudinal protrusions having enlarged head portions and narrowed neck portions that engage similarly shaped openings. Mating this type of splice formation can improve the tension strength at the end connection, due to the engaged cut edges of the belt providing structural resistance in addition to the joining material of the end connection. However, to form this type of splice formation 118, two different cuts must be made for a spacing to be formed between the cut ends, such as with two differently shaped dies or blades. Another type of splice formation is a step or stepped splice formation 318, which includes longitudinally separated cut edges at separated layers of the conveyor belt extending across the width of the conveyor belt.

Once cut or otherwise formed, the cut edges 20 at the end portions 16 may be generally perpendicular to and extend between the upper and lower surfaces of the conveyor belt 12. Also, the cut edges 20 may have exposed woven filaments 24 of the fabric carcass 22, such that an interior area of the woven filaments 24 are exposed along the cut edges 20. The interior area of the woven filaments may not include the polymers of the layer of polymer 26, which may, however, be impregnated in the pores between the woven filaments 24.

Figure 11:
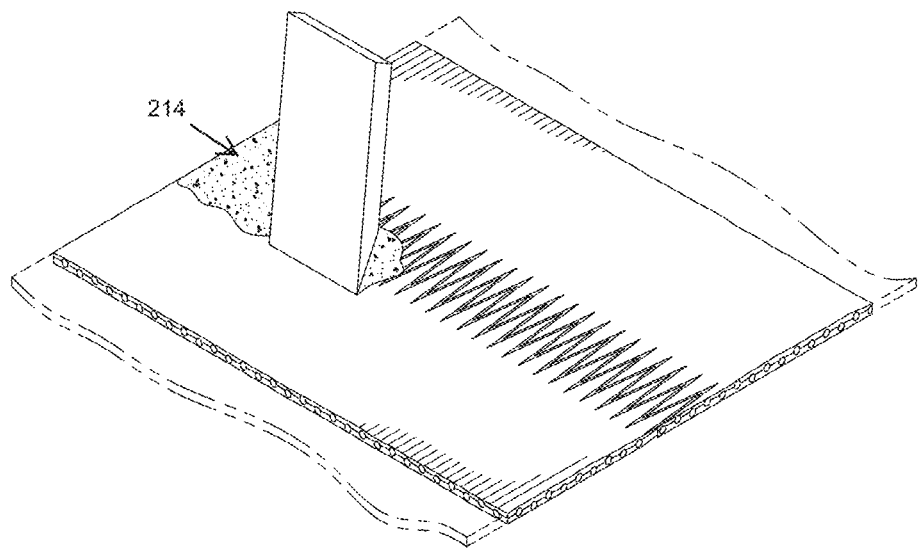
FIG. 11 is an upper perspective view of opposing ends of a conveyor belt, having a granular thermoplastic material inserted into the space between the cut ends of the conveyor belt.
Figure 11A:
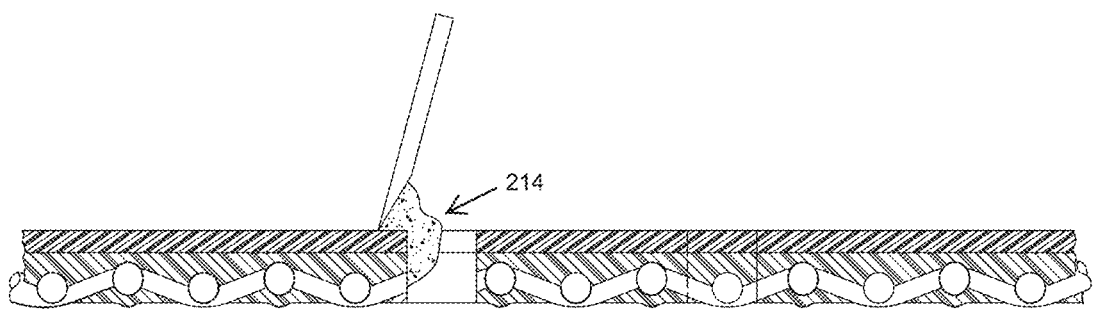
FIG. 11A is a cross-sectional view of the conveyor belt and the granular thermoplastic material shown in FIG. 11, being moved into the space between the ends of the conveyor belt.
Figure 12A:
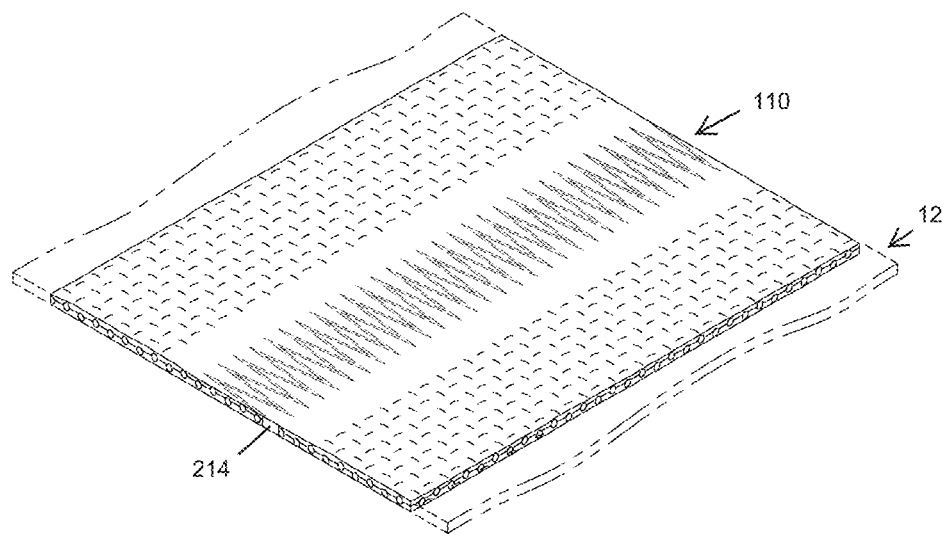
FIG. 12A is a bottom perspective view of the opposing ends of the conveyor belt and the seamless end connection shown in FIG. 12.
Figure 12B:
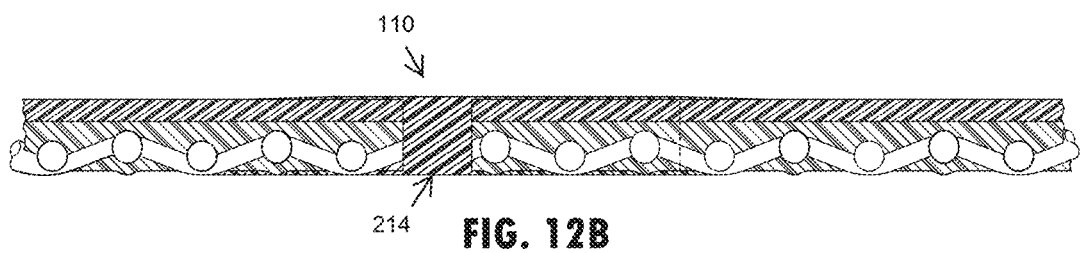
FIG. 12B is a cross-sectional view of the opposing ends of the conveyor belt and the seamless end connection shown in FIG. 12.

A thermoplastic connector may then be inserted in the defined spacing 36 between the cut edges 20 of the splice formation 18, such that the connector substantially fills or occupies the entire spacing 36 between the upper and lower exterior surfaces of the conveyor belt 12. The connector 14 comprises a joining material, such as a thermoplastic copolyester elastomer, that is used to thermally engage between the cut edges of the opposing end portions. The thermoplastic copolyester elastomer may, for example, be DuPont's Hytrel® or a similar material. As shown in FIGS. 4-7B and FIG. 10, the joining material may be provided as a preformed piece that is shaped to be substantially identical to the defined space by the shape of the splicing configuration. Such a preformed piece may be injection molded, extruded, or cut from a sheet of material, such as with the same die or blade used to cut the finger splice formation in the belt. Alternatively, as shown in FIGS. 11-12A, the joining material may include a granular substance that is moved into the space and leveled to have a thickness generally equal to the thickness of the conveyor belt. It is also contemplated that a combination of a pre-formed piece and a granular substance may be used, and further conceivable that the joining material may include an additive to form a paste or gel or the like.

Figure 6:
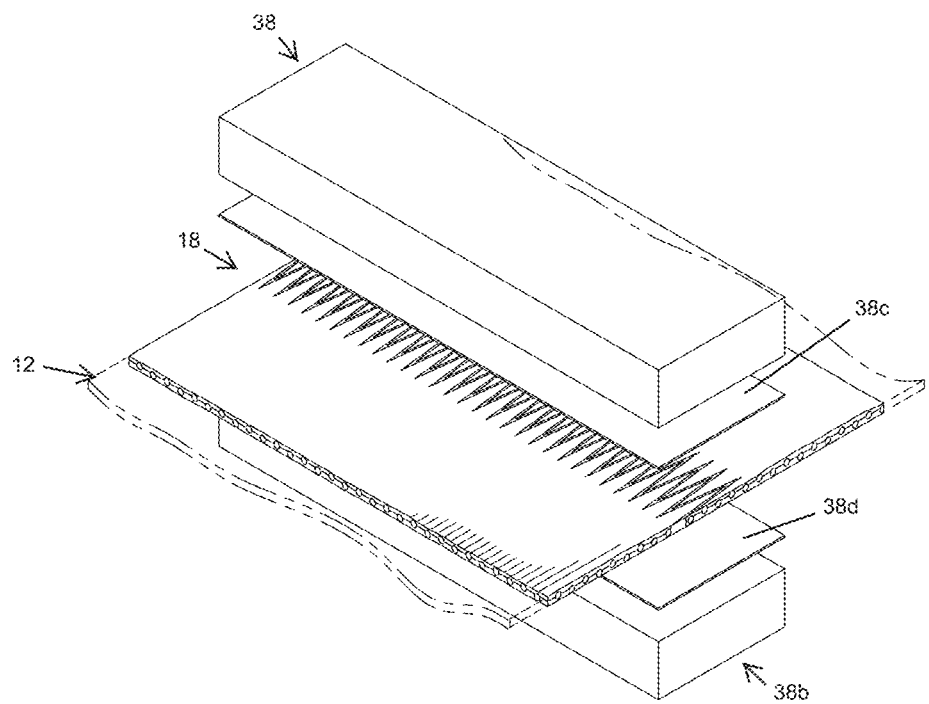
FIG. 6 is an upper perspective view of the opposing ends the conveyor belt shown in FIG. 5, having a heating device spaced from the belt for heating the thermoplastic connector between the ends of the conveyor belt to form a seamless end connection.
Figure 6A:
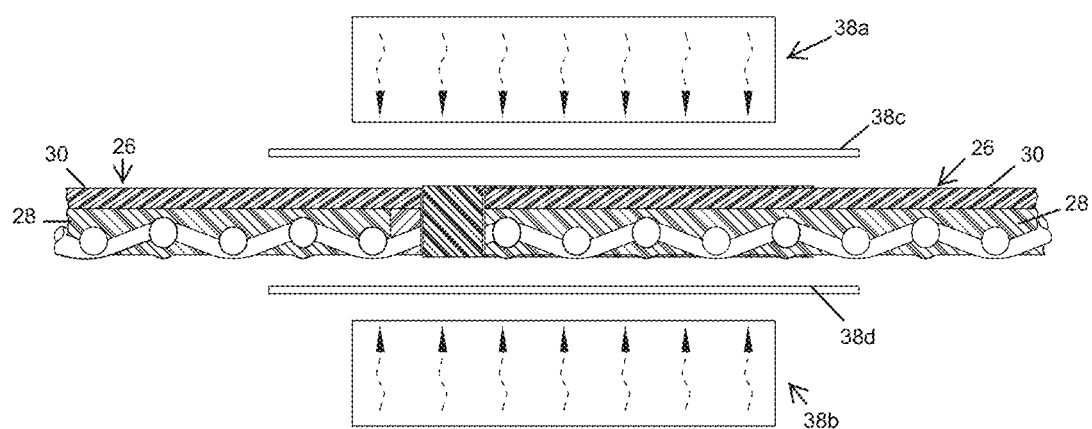
FIG. 6A is a cross-sectional view of the conveyor belt and the heating device spaced from the belt shown in FIG. 6.

After the thermoplastic connector 14 is inserted in the opening between the cut edges, the thermal adhesion is provided by heating the opposing ends of the conveyor belt to cause the joining material to adhere to exposed filaments the fabric carcass at the cut edges of each opposing end portion. For example, as shown in FIGS. 6-6A, a heating device 38 may be provided to heat the opposing ends of the conveyor belt to a temperature greater than a melting point of the joining material. The illustrated heating device includes two opposing hot plates 38a, 38b that are pressed into contact with the opposing ends of the belt, with a foil 38c, 38d or other separation substrate placed between the belt and the contact surfaces of the hot plates to prevent adhesion to the hot plate itself. It is understood that various heating devices and assemblies by be used to heat the connector and form the seamless end connection of the present invention.

Figure 7:
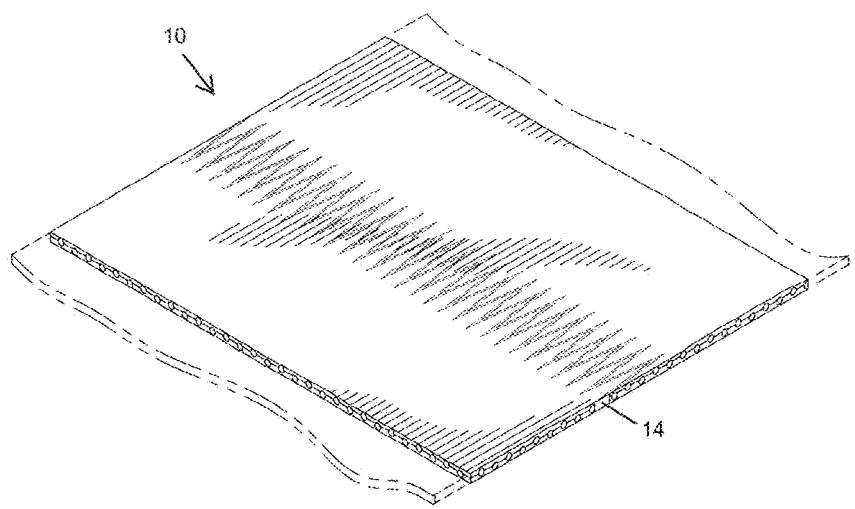
FIG. 7 is an upper top perspective view of the opposing ends the conveyor belt shown in FIG. 6, after the heating device thermally engages the thermoplastic connector between the ends of the conveyor belt.
Figure 7A:
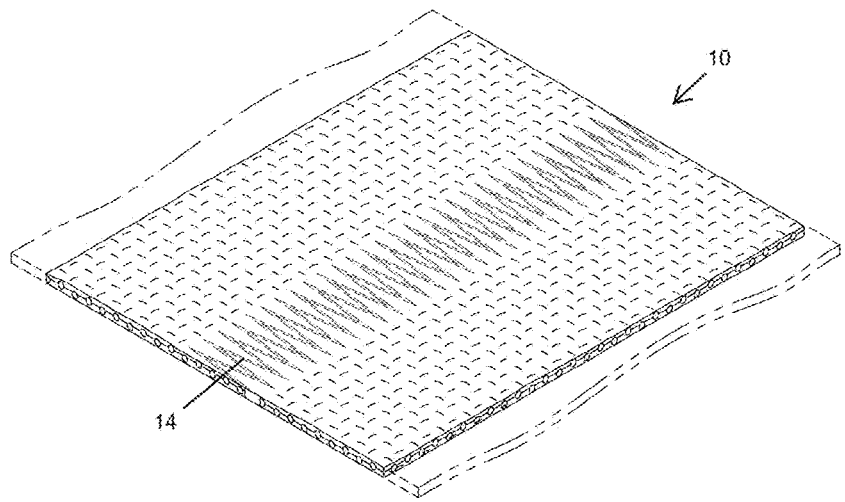
FIG. 7A is a bottom perspective view of the conveyor belt and the engaged thermoplastic connector shown in FIG. 7.
Figure 7B:
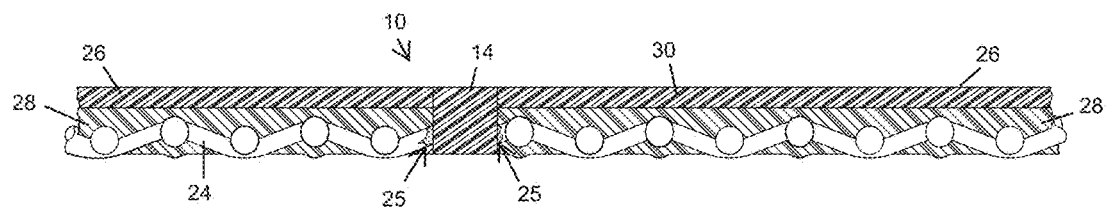
FIG. 7B is a cross-sectional view of the conveyor belt and the engaged thermoplastic connector shown in FIG. 7.
Figure 7C:
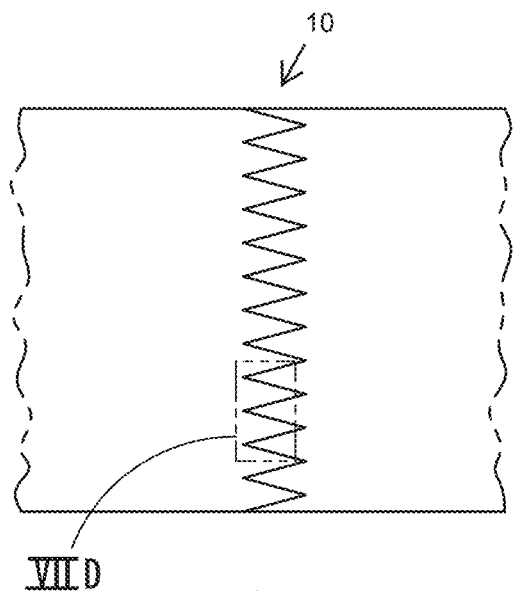
FIG. 7C is a top plan view of the conveyor belt and the engaged thermoplastic connector shown in FIG. 7.
Figure 7D:
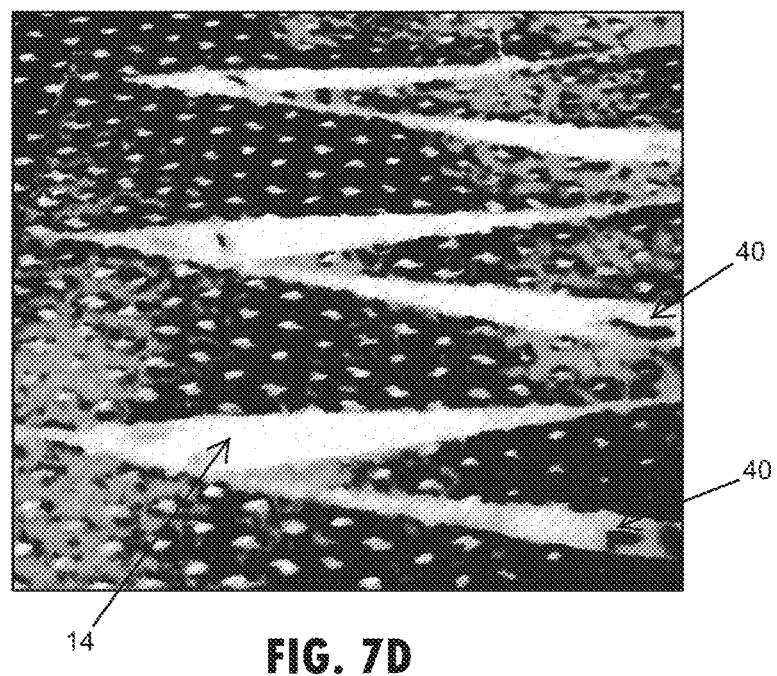
FIG. 7D is an enlarged photographic representation of the section of the engaged connector shown in the area designated VIID in FIG. 7C, taken from a bottom side of the conveyor belt.

Upon heating the end portions to the desired temperature, the thermoplastic connector 14 softens or melts to adhere to the cut ends, such as by flowing into and filling or impregnating the open pores or interior area 25 of the exposed woven filaments 24 of the fabric carcass on each opposing cut edge. Also, when a portion of the layer of polymer 26 of the conveyor belt includes the same or similar material as the thermoplastic connector 14, such as thermoplastic copolyester elastomer, the thermoplastic connector may fuse with the layer of polymer to provide an integral loop of the thermoplastic material. For example, as shown in FIG. 7B, the connector and the cover layer 30 of the conveyor belt 12 are made of thermoplastic copolyester elastomer, and after heating, have fused and integrated into a single and unitary piece of thermoplastic copolyester elastomer. Similarly, such as shown in FIG. 7D, an edge portion of the base layer 28 of polymer may be made of a different material, such as PVC, which may melt and flow into the thermoplastic connector, forming flow members 40 that extend into and integrate with the body of the joining material of the connector 14. Optionally, without crossflow of material between the belt ends and the connector, such as when the belt includes a thermosetting material, it is also conceivable that the seamless connection may be formed solely by the adhesive properties of the thermoplastic copolyester elastomer thermally engaging the surface area of the cut edges formed by the finger splice formation.

Figure 8:
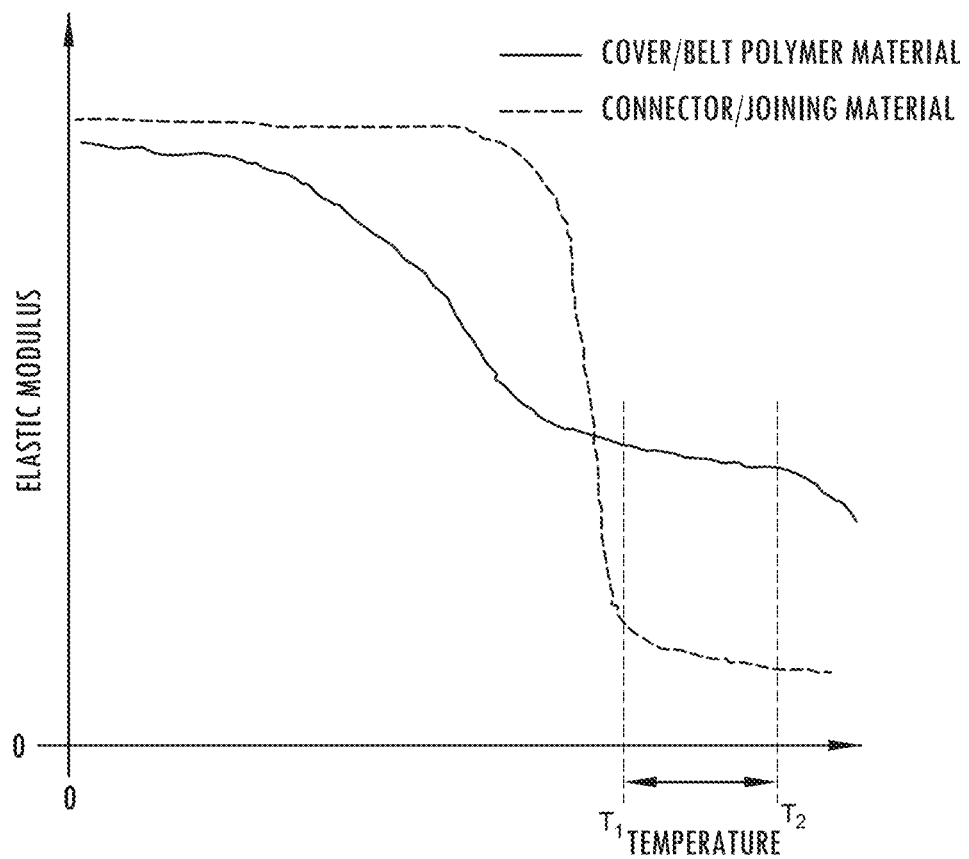
FIG. 8 is a graph of a change in elastic modulus over increasing temperature for a polyvinyl chloride layer of the belting and a thermoplastic copolyester elastomer of the connector between the ends of the belt, illustrating a temperature range for effective joining.

With reference to the desired temperature to form the connection, an exemplary graph is provided in FIG. 8 that shows the elastic modulus behavior over a range of temperatures for a polymer material on the conveyor belt, such as PVC, and the polymer joining material of the connector, such as thermoplastic copolyester elastomer. As shown, the glass transition for the PVC spans a much greater temperature range than the connector, evidencing the high operating heat capability of the connector. As further shown in FIG. 8, the PVC begins to soften at around 80 degrees Celsius and does not reach its melting point until around 160 degrees Celsius, while the thermoplastic copolyester elastomer of the connector softens at around 110 degrees Celsius and reaches its melting point at around 140 degrees Celsius. The connector and the PVC have both generally reached their melting points at the first temperature T1, which defines the start of the optimal range of adhesion for the connector. The PVC begins to degrade at the second temperature T2, whereby the material can be damaged visually and/or structurally. Accordingly, the optimal range of adhesion extends from about from T1 to T2. In one example, T1 may be about 160 degrees Celsius and T2 may be about 220 degrees Celsius, such that the preferable adhesion temperature for the heat source may be around 180 to 185 degrees Celsius. The dwell time for one exemplary connector and conveyor belt at the heating device to form the seamless end connection is between 1 and 10 minutes, although longer or shorter dwell times may be more preferable for differently dimensioned belts and alternatively configured heating devices.

The thermally engagement of the thermoplastic connector between the opposing ends of the conveyor belt forms a seamless end connection that may withstand at least four times a working load of the conveyor belt. For example, the resulting end connection may be configured to withstand at least 200 lbs per inch of a width of the conveyor belt in an operational load condition.

Optionally, to provide a more visually seamless connection on the exterior surface of a conveyor belt that does not have a cover layer of substantially the same material as the thermoplastic connector, such as when only a base layer of PVC is provided over the fabric carcass, a thin layer of PVC material without any fiber or fabric backing may be disposed over the thermoplastic connector. The thin layer may then span the gap or space between the cut edges that is filed with the thermoplastic connector. This thin layer may be applied prior to heating the connector or after, as a separate heating step, to melt the thin layer over the connector. For example, such a thin layer may have a thickness around 0.5 mm or less, and optionally, may be predisposed on or attached to an upper surface of a preformed connector.

With respect to the conveyor belt end connection 310 shown in FIGS. 13A-13C, a conveyor belt 312 is provided that includes a multiple fabric layer construction that is spliced in a step or stepped splice formation 318 at the opposing end portions 316 of the conveyor belt 312. The conveyor belt 312 includes a cover layer 330 that is disposed over the base layer, such as a fabric carcass 322 having two or more fabric layers, and it may comprise a thermosetting polymer or rubber or the like, which can make a finger splice formation less desirable for forming the end connection. The stepped splice formation 318 is cut or otherwise formed entirely through the belt 312 between the exterior surfaces of the belt to define a shape that aligns or meshes with the other opposing end portion 316 in a manner that provides a stepped interface between the cut edges 320. Specifically, the illustrated stepped splice formation 318 includes longitudinally separated cut edges at separated layers of the conveyor belt extending across the width of the conveyor belt. As shown in FIG. 13A, at each end portion 316 of the belt, a lower layer 322a of the fabric carcass 322 is separated from an upper layer 322b that is attached to the cover layer 330. At one of the cut ends, the upper layer 322b and the attached cover 330 are cut away from the lower layer to leave the remaining portion of the lower layer 322a exposed along the width of the belt. Conversely, at the other cut end, the lower layer 332a is cut away from the upper layer 322b and the cover 330, leaving the remaining upper layer and cover extending longitudinally from the cut edge of the lower layer a length that is substantially equal to the remaining lower layer at the other cut end.

To connect the stepped splice formation, such as shown in FIGS. 13B and 13C, a thermoplastic connector 314 comprising a thin layer or film sheet of thermoplastic copolyester elastomer is disposed over the upper surface of the extending portion of the lower layer 322a. This piece or pieces of thermoplastic elastomer is then heated, such as with a heating device shown in FIGS. 6 and 6A, to soften and/or melt the connector material and press the material into the vertical spacing between the exposed edges of the cover and the upper and lower layers 322b, 322c of the fabric carcass. The layers of fabric may be infused or covered with a polymer, such as a thermoplastic or thermosetting polymeric material, which is thermally engaged by the connector between the exposed surfaces of the stepped splice formation. It is also contemplated that the cut ends of the fabric carcass 322 may be thermally engaged by the thermoplastic connector 314, such as described in the embodiments discussed above. When the splice formations are aligned, the thermoplastic connector is thermally engaged and continuously interconnected between the ends for conveyor belt to form a seamless end connection.

Changes and modifications in the specifically-described embodiments may be carried out without departing from the principles of the present invention, which is intended to be limited only by the scope of the appended claims as interpreted according to the principles of patent law including the doctrine of equivalents. It is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

The invention claimed is:

1. An endless conveyor belt loop formed by connecting ends of a fabric belt, said endless conveyor belt loop comprising:
a single fabric conveyor belt having a fabric carcass and a layer of polymer disposed over an upper portion of the fabric carcass;
wherein opposing ends of the conveyor belt each include a finger splice formation that is defined by a cut edge having exposed woven filaments of the fabric carcass; and
a thermoplastic connector thermally engaged between the opposing ends of the conveyor belt, wherein the thermoplastic connector is impregnated into the exposed woven filaments of the fabric carcass of each opposing end and has a thickness substantially equal to the conveyor belt to form a seamless end connection, and wherein the thermoplastic connector comprises a thermoplastic copolyester elastomer.

2. The endless conveyor belt loop of claim 1, wherein the layer of polymer disposed over the fabric carcass comprises a thermoplastic elastomer, such that, upon heating the thermoplastic connector to form the seamless end connection, the layer of polymer flows into the thermoplastic connector.

3. The endless conveyor belt loop of claim 1, wherein the cut edges of the finger splice formations extend generally perpendicularly between upper and lower surfaces of the conveyor belt.

4. The endless conveyor belt loop of claim 1, wherein the finger splice formation on each opposing end is shaped to matably align with the other and provide a substantially continuous space between the cut edges.

5. The endless conveyor belt loop of claim 1, wherein the layer of polymer disposed over the fabric carcass comprises a thermoplastic copolyester elastomer, such that the thermoplastic connector is fused with the layer of polymer to provide an integral loop of thermoplastic copolyester elastomer.

6. The endless conveyor belt loop of claim 1, wherein the thermoplastic connector is configured to withstand at least 200 lbs per inch of a width of the conveyor belt in an operational load condition.

7. The endless conveyor belt loop of claim 1, wherein the thermoplastic connector fills a substantially continuous space between the opposing ends of the conveyor belt, and wherein the space between the opposing ends is greater than about 0.5 mm.

8. The endless conveyor belt loop of claim 1, wherein the woven fabric of the conveyor belt includes a first set of filaments woven in a longitudinal direction and a second set of filaments woven in a lateral direction, and wherein the conveyor belt is configured to convey loads in the longitudinal direction.

9. The endless conveyor belt loop of claim 1, wherein the thermoplastic connector includes a pre-formed piece that is shaped to be substantially identical to the shape of the finger splicing formation.

10. The endless conveyor belt loop of claim 1, wherein the single fabric conveyor belt includes a reinforcing polymer comprising polyvinyl chloride disposed in a layer between the fabric carcass and the layer of polymer forming the upper surface of the belt.

11. An endless conveyor belt loop, comprising:
a single conveyor belt having an elongated body and a substantially uniform width, wherein ends of the conveyor belt each include a splice formation extending across the width of the conveyor belt that are each configured to mate with the other; and
a thermoplastic connector thermally engaged between exposed surfaces formed by the splice formation at the ends of the conveyor belt, wherein, when the splice formations are aligned, the thermoplastic connector is thermally engaged and continuously interconnected between the ends for conveyor belt to form a seamless end connection, and wherein the thermoplastic connector comprises a thermoplastic copolyester elastomer.

12. The endless conveyor belt loop of claim 11, wherein the conveyor belt includes a cover layer disposed over a fabric carcass, and wherein the cover comprises a thermosetting polymer.

13. The endless conveyor belt loop of claim 11, wherein the conveyor belt comprises a fabric carcass and a layer of polymer disposed over the fabric carcass that comprises a thermoplastic elastomer, and wherein the thermoplastic connector thermally engages exposed woven filaments of the fabric carcass at cut edges of the fabric carcass formed by the splice formation.

14. The endless conveyor belt loop of claim 11, wherein the splice formation includes at least one of (i) a finger formation with a cut edge forming a series of longitudinal protrusions spaced across the width of the conveyor belt and (ii) a step formation with longitudinally separated cut edges at separated layers of the conveyor belt extending across the width of the conveyor belt.

15. The endless conveyor belt loop of claim 11, wherein the thermoplastic connector is configured to withstand at least 200 lbs per inch of a width of the conveyor belt in an operational load condition.

16. The endless conveyor belt loop of claim 11, wherein the splice formation on each opposing end is shaped to matably align with the other and provide a substantially continuous space between the cut edges, and wherein the thermoplastic connector includes a pre-formed piece that is shaped to fit within the substantially continuous space.

17. A method for connecting opposing ends of a conveyor belt to form an endless conveyor belt loop, said method comprising:
   providing a conveyor belt having (i) a single fabric carcass that includes a first set of filaments extending in a lateral direction that are woven with a second set of filaments extending in a longitudinal directions between opposing ends of the conveyor belt, and (ii) an exterior polymer disposed in a layer over the fabric carcass;
   cutting opposing ends of the conveyor belt in a finger splicing configuration that includes longitudinal protrusions spaced along an edge of each opposing end with openings defined between the longitudinal protrusions;
   aligning the longitudinal protrusions of each opposing end with the openings on each opposing end to define a space between the opposing ends;
   filling the defined space between the opposing ends of the conveyor belt with a joining material comprising thermoplastic copolyester elastomer; and
   heating the opposing ends of the conveyor belt to cause the joining material to adhere to exposed filaments the fabric carcass at the edges of each opposing end to form a seamless end connection.

18. The method of claim 17, wherein the exterior polymer disposed over the fabric carcass comprises a thermoplastic copolyester elastomer, such that the joining material fuses with the exterior polymer to form an integral loop of thermoplastic copolyester elastomer.

19. The method of claim 17, wherein a heating device heats the opposing ends of the conveyor belt to a temperature greater than a melting point of the joining material.

20. The method of claim 17, wherein the joining material includes a granular substance that is moved into the space and leveled to have a thickness generally equal to the thickness of the conveyor belt.

21. The method of claim 17, wherein the joining material includes a pre-formed piece that is shaped to be substantially identical to the defined space by the shape of the finger splicing configuration.

22. The method of claim 17, wherein the space between the opposing ends is substantially continuous and generally greater than about 0.5 mm.

23. The method of claim 17, wherein the seamless end connection is configured to withstand at least 200 lbs per inch of a width of the conveyor belt.

24. The method of claim 17, wherein the conveyor belt includes a reinforcing polymer comprising polyvinyl chloride disposed in a layer between the exterior polymer and the fabric carcass, wherein the exterior polymer provides greater compressive resiliency than the reinforcing polymer.

* * * * *